(No Model.)
P. WALL.
Manufacture of Mill Lamps.
No. 237,147. Patented Feb. 1, 1881.
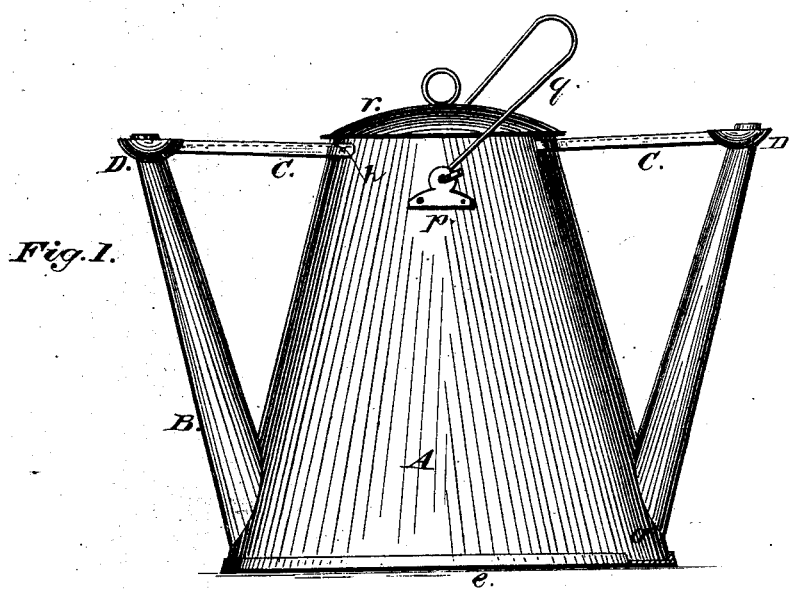
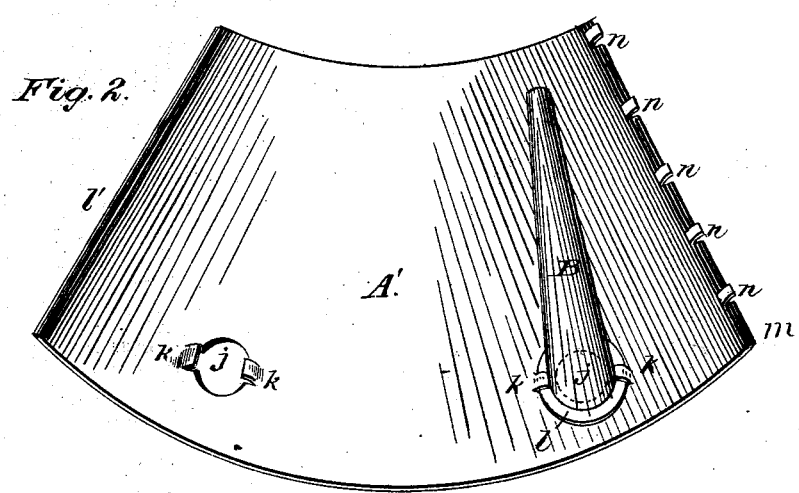
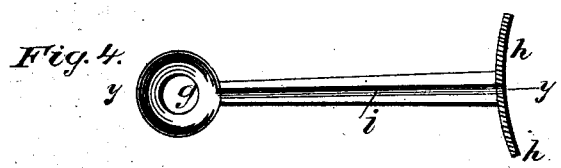
Witnesses
Fred. G. Dietrich
A. H. Krause
Inventor.
Patrick Wall.
By J. J. Johnston,
his attorney.

UNITED STATES PATENT OFFICE.

PATRICK WALL, OF ALLEGHENY, PENNSYLVANIA.

MANUFACTURE OF MILL-LAMPS.

SPECIFICATION forming part of Letters Patent No. 237,147, dated February 1, 1881.

Application filed October 22, 1880. (No model.)

*To all whom it may concern:*

Be it known that I, PATRICK WALL, of Allegheny, in the county of Allegheny and State of Pennsylvania, have invented a new and useful Improvement in the Manufacture of Mill-Lamps; and I do hereby declare that the following is a full and exact description thereof, reference being had to the accompanying drawings, and to the letters of reference thereon.

In the manufacture of mill-lamps it has been found that the ordinary method of constructing them is deficient in that the seaming and soldering of the joints fail to make them sufficiently tight and strong enough to withstand the rough handling such lamps are subjected to. To obviate the disadvantage of leakage and make such lamps sufficiently strong for the rough manipulation that mill-lamps have to stand in mills and mines and other places analogous thereto, I construct the lamp in the mannner hereinafter more fully described.

In the accompanying drawings, which form part of my specification, Figure 1 is a side elevation of my improvement in mill-lamps. Fig. 2 represents the sheet of metal cut in form for forming the body of the lamp, and also representing one of the wick-tubes in position prior to being brazed thereto. Fig. 3 represents a transverse section of the bottom of the lamp. Fig. 4 represents a top view or plan of the brace and cup used for bracing the wick-tube to the body of the lamp, and surrounding the upper portion of said tube with a cup for heating the unconsumed oil, for the purpose hereinafter stated. Fig. 5 is a longitudinal section of the same at line $y\,y$ of Fig. 4.

In constructing the lamp I cut a sheet of metal of the desired thickness into the form substantially as shown in Fig. 2. In this sheet I form two openings, $j\,j$, for the wick-tubes B B. On each side of the openings $j\,j$, I cut through the metal, as indicated at $k$, so that lips may be turned up. Under these lips are placed flanges $l$, which are on the lower end of the wick-tubes B B. The lips $k$ are then hammered down on the flanges $l$, as shown in Fig. 2, which will hold the wick-tube B in juxtaposition with relation to the sheet A'.

Having the wick-tubes secured to the sheet A' in the manner just described, it is then ready for the operation of brazing said tubes to said sheet. Experience has demonstrated that this is the only practical method of brazing said tubes to the body of the lamp. Other means are attended with great trouble, loss of time, and very often fail to make a perfect brazed joint; but if the wick-tubes are secured to the flat sheet A' as hereinbefore described, the brazing can be accomplished with facility and at diminished cost. The wick-tubes are brazed to the sheet A', and the edge $m$ of the sheet A' nicked and lips turned up, as at $n$, and the edge $l'$ hammered to a bevel. The sheet A' thus prepared is bent into form of a section of a hollow cone. The edge $l'$ is then placed under the lips $n$ and said lips hammered down upon the edge $l'$. The side seam is then ready for brazing, which is done in the usual manner. The bottom $e$ is formed with flange $f$, as indicated in Fig. 3, which flange projects above the lower edge of the lamp. This flange $f$ is hammered in against the incline wall of the body, as indicated at $o$ in Fig. 1, (which is shown at this point in section.) The bottom $e$ is then ready for being brazed in the ordinary manner to the body A. The brace C and cup D are made in one piece, (being a malleable casting or wrought-iron swaged to the desired form,) and is placed with the opening $g$ over the ends of the tubes B. The flange or lugs $h$ are then riveted to the body of the lamp, and the joint formed at the bottom of the cup D around and near the upper end of the wick-tubes B is then brazed. The lugs $p$ are then riveted to the body A near its upper edge for the bail $q$. The lid $r$ is of the ordinary construction.

The brace C may be furnished with a groove, $i$, for conducting back any unconsumed oil into the body of the lamp; but this groove $i$ will never be called into use while the lamp is burning, for the oil flowing from the wick and upper end of the wick-tubes B, as it collects in the cup D, is heated to the vaporizing-point and burns with a bright flame, adding much to the efficiency of the lamp for giving light. The oil which collects in the cups D when the lamp is not burning flows back through the groove $i$ into the body A, the brace being inclined for that purpose. When lamps of this class are not burning, experience has demonstrated that oil will pass up the wicks and flow down over the dishes D and overflow the wick-tubes B by the usual capillary attraction, which oil soils the lamp and everything upon which it is placed. This outflowing oil is a very objectionable feature, but it is utilized by means of the cup D for making a better light when the lamp is burning, and when not burning the cup D and groove $i$ convey the outflow back into the body A, thereby keeping the exterior of the lamp clean.

A mill-lamp with its body A, wick-tubes B, and bottom $e$, constructed of sheet metal, as hereinbefore described, with its joints formed as set forth, and brazed, as specified, will be found strong, durable, and can be manufactured cheaply, meeting all the conditions required for a mill-lamp.

I am aware that the body of coffee and similar pots having perforations and flanges and a lip or spout secured thereto by said flanges being placed and soldered in the fold of a flange of said lip or spout is old; but in such case the flange of the lip or spout is folded inward, and the flanges of the body turned outward and placed between the folds of the flange. Such arrangement will not answer for brazing, as the high heat to which the metal is subjected to in the brazing process will expand the lid or spout to such degree that the brazing could not be accomplished with any degree of certainty or perfection; but by my arrangement, hereinbefore described, of turned-up lips in the body of the lamp, and the flange placed between said lips and body, the tendency of the expansion of the parts during the heating and brazing process will tighten said parts and hold them more firmly together.

Having thus described my improvement, what I claim is—

1. A sheet-metal lamp having its seams formed by lips cut out of one edge of the metal and turned up, as described, the other edge of the metal being inserted between the turned-up lips and the nicked edge and brazed, as set forth.

2. A sheet-metal blank for the body of a lamp having the beveled-edged flange $l'$, and the nicked edge $m$, and the turned-up lips $n$, substantially as and for the purpose herein shown and described.

3. The brace C, having groove $i$, lugs $h$, and cup D, constructed in one piece of malleable cast-iron or wrought-iron, in combination with the wick-tube B and body A of the lamp, substantially as herein described, and for the purpose set forth.

PATRICK WALL.

Witnesses:
 A. C. JOHNSTON,
 JAMES J. JOHNSTON.